United States Patent
Ikura et al.

(10) Patent No.: US 9,819,238 B2
(45) Date of Patent: Nov. 14, 2017

(54) ROTARY ELECTRIC MACHINE HAVING STATOR WITH COIL CONDUCTORS HAVING DIFFERENT CROSS-SECTIONAL WIDTH

(71) Applicant: MITSUBISHI ELECTRIC CORPORATION, Chiyoda-ku, Tokyo (JP)

(72) Inventors: Yutaka Ikura, Chiyoda-ku (JP); Shinkichi Sawa, Chiyoda-ku (JP); Tatsuro Hino, Chiyoda-ku (JP); Tetsuya Yokogawa, Chiyoda-ku (JP); Atsushi Sakaue, Chiyoda-ku (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 163 days.

(21) Appl. No.: 14/196,569

(22) Filed: Mar. 4, 2014

(65) Prior Publication Data
US 2015/0084449 A1    Mar. 26, 2015

(30) Foreign Application Priority Data
Sep. 26, 2013    (JP) .................................. 2013-199493

(51) Int. Cl.
*H02K 3/00* (2006.01)
*H02K 3/12* (2006.01)
*H02K 3/34* (2006.01)

(52) U.S. Cl.
CPC .............. *H02K 3/12* (2013.01); *H02K 3/345* (2013.01); *H02K 2213/09* (2013.01)

(58) Field of Classification Search
CPC .......... H02K 3/12; H02K 3/245; H02K 3/345; H02K 3/24; H02K 3/04; H02K 3/30;
(Continued)

(56) References Cited

U.S. PATENT DOCUMENTS 1,789,129 A * 1/1931 Apple ...................... H02K 3/12
                                                            29/598
1,917,482 A * 7/1933 Apple .................... H02K 13/08
                                                            200/33 R
(Continued)

FOREIGN PATENT DOCUMENTS

JP        05-308736 A     11/1993
JP        07-213000 A      8/1995
(Continued)

OTHER PUBLICATIONS

Communication dated Oct. 28, 2014, issued by the Japanese Patent Office in counterpart Japanese application No. 2013-199493.

*Primary Examiner* — Michael Andrews
*Assistant Examiner* — Maged Almawri
(74) *Attorney, Agent, or Firm* — Sughrue Mion, PLLC; Richard C. Turner

(57) ABSTRACT

Obtain a rotary electric machine by which a share of coil slots for a stator winding in slots, which are formed in a stator core, can be increased, and heat generation at a central portion of a stator can be decreased. The stator winding is composed of coil slots, which are inserted to the slots, and coil ends extended toward the outside in the axis direction of the stator core; and the coil conductors of the coil slots are configured in such a way that cross-sectional areas at central portions in the axis direction are wider cross-sectional areas at both end portions, and the cross-sectional areas of the coil conductors are reduced along the coil slots from the central portions to the both end portions.

3 Claims, 7 Drawing Sheets

(58) Field of Classification Search
CPC .. H02K 3/34; H02K 3/44; H02K 3/48; H02K 2213/09; H02K 15/00; H02K 15/0025; H02K 15/0031; H02K 15/04; H02K 15/0421; H02K 15/0471; H02K 15/064
USPC ............... 310/54, 45, 179–208; 29/596, 825
See application file for complete search history.

(56) References Cited

U.S. PATENT DOCUMENTS

| | | | | |
|---|---|---|---|---|
| 3,079,519 | A * | 2/1963 | Kitson, Jr. | H02K 3/34 156/185 |
| 6,291,918 | B1 * | 9/2001 | Umeda | H02K 1/165 310/215 |
| 6,710,496 | B2 * | 3/2004 | Fujita | H02K 3/12 310/201 |
| 6,865,796 | B1 * | 3/2005 | Oohashi | H02K 3/12 242/432 |
| 7,302,750 | B2 * | 12/2007 | Niimi | H02K 3/12 29/596 |
| 7,847,465 | B2 * | 12/2010 | Tokizawa | H02K 3/12 29/596 |
| 8,122,593 | B2 * | 2/2012 | Gorohata | H01F 41/08 242/432.5 |
| 8,487,498 | B2 * | 7/2013 | Patel | H02K 3/12 310/184 |
| 8,508,085 | B2 * | 8/2013 | Bradfield | H02K 1/20 310/52 |
| 8,872,397 | B2 * | 10/2014 | Nonaka | H02K 1/148 29/605 |
| 2002/0011753 | A1 * | 1/2002 | Asao | H02K 3/50 310/45 |
| 2003/0015932 | A1 * | 1/2003 | Oohashi | H02K 15/0478 310/201 |
| 2009/0102309 | A1 * | 4/2009 | Kamibayashi | H02K 1/165 310/195 |
| 2010/0026133 | A1 * | 2/2010 | Fubuki | H02K 3/18 310/208 |
| 2015/0084449 | A1 * | 3/2015 | Ikura | H02K 3/12 310/45 |

FOREIGN PATENT DOCUMENTS

| | | |
|---|---|---|
| JP | 2000-050576 A | 2/2000 |
| JP | 2012-019590 A | 1/2012 |
| JP | 2012-80610 A | 4/2012 |
| JP | 4956162 B2 | 6/2012 |
| JP | 2013-143860 A | 7/2013 |
| JP | 2013-188034 A | 9/2013 |

* cited by examiner

ROTARY ELECTRIC MACHINE HAVING STATOR WITH COIL CONDUCTORS HAVING DIFFERENT CROSS-SECTIONAL WIDTH

BACKGROUND OF THE INVENTION

Field of the Invention

The present invention relates to a rotary electric machine that includes a rotor core, in which a plurality of slots are formed in a circumference direction, and a coil winding which is composed of a plurality coil conductors being surrounded around the slots of the rotor core.

Description of the Background Art

In conventional rotary electric machines, there has been a rotary electric machine that includes a stator core, 3-phase stator coils wound around the stator core, and inter-phase insulating papers provided at coil ends which are protruded from an end surface of the stator core of each of the stator coils. The 3-phase stator coils are respectively connected to separated poles, and the inter-phase insulating papers include in-phase papers which are arranged from one side of inner surface side and outer surface side of one of the coil ends to the other side of inner surface side and outer surface side of in-phase coil ends neighboring the one of the coil ends, and different-phase papers which are arranged between different-phase (for example, refer to Patent Document 1).

Moreover, in the other conventional rotary electric machine, 3-phase stator coils—U-phase stator coil, V-phase stator coil, and W-phase stator coil—are arranged in a stator for a 3-phase rotary electric machine.

The 3-phase stator coils—U-phase stator coil, V-phase stator coil, and W-phase stator coil—are inclined, at coil ends, in a circumferential direction and arranged in the same sequential arrangement in such a way that a state, in which the stator coils are slanted, at one side in the circumferential direction, toward an end portion at an outer circumferential side in a diameter direction, is shifted to a state, in which the stator coils are slanted, at the other side in the circumferential direction, toward an end portion at an inner circumferential side in the diameter direction. At the coil ends of the stator coils, a plurality of crossover wires for connecting etch of in-phase coils are crossed over the other 2-phase stator coils and arranged. In the other conventional rotary electric machine, an insulating tube having an insulating capability is wound around the crossover wires (for example, refer to Patent Document 2).
[Patent Document 1]
Japanese Patent Publication No. 4956162
[Patent Document 2]
Japanese Laid-Open Patent Publication No. 2012-80610

In conventional rotary electric machines, a distributed-winding rotary electric machine includes portions at coil ends of stator coils, on which one of stator coils crosses over the other 2-phase stator coils, so that it has been required that an insulation distance between the stator coils in slots formed in a stator core is longer than an insulation distance at the coil ends. Therefore, when all windings of the stator coils have the same cross-sectional area, it is required that the cross-sectional area of the coil (diameter of wire) is determined in accordance with the coil ends of the stator coils.

When the cross-sectional area of the coil is determined in accordance with the coil ends of the stator coils, the cross-sectional area is not determined in accordance with the slots of the stator coils, so that there has been a problem in that a share of the area in the slots is decreased.

SUMMARY OF THE INVENTION

The present invention has been made to solve above-described problems, and an object of the invention is to obtain a rotary electric machine in which a share of coil slots for a stator winding in slots, which are formed in a stator core, can be increased, and heat generation at a central portion of a stator can be decreased.

A rotary electric machine according to the present invention includes a stator core having an annular shape, in which a plurality of slots formed in an axis direction are arranged in a circumferential direction; and a stator winding which is composed of a plurality of coil conductors wound around the slots of the stator core; wherein the stator winding is composed of coil slots, which are inserted to the slots, and coil ends extended toward the outside in the axis direction of the stator core; and the coil conductors of the coil slots are configured in such a way that cross-sectional areas at central portions in the axis direction are wider cross-sectional areas at both end portions, and the cross-sectional areas of the coil conductors are reduced along the coil slots from the central portions to the both end portions.

According to the rotary electric machine of the present invention, the stator winding is composed of coil slots, which are inserted to the slots, and a coil end extended toward the outside in the axis direction of the stator core; and the coil conductors of the coil slots are configured in such a way that a cross-sectional area at a central portion in the axis direction is wider the cross-sectional area at each of both end portions, and the cross-sectional area of the coil conductors is reduced in the axis direction from the central portion to each of the both end portions. Therefore, a share of coil slots for a stator winding in slots, which are formed in a stator core, can be increased, and heat generation at a central portion of a stator can be decreased.

DETAILED DESCRIPTION OF THE PREFERRED EMBODIMENTS

Embodiment 1

Hereinafter, a rotary electric machine according to Embodiment 1 of the present invention will be explained in reference to FIG. 1 through 14, and reference symbols, which are the same as those in each of the drawings, refer to the same or equivalent parts so as to be explained.

Figure 1:
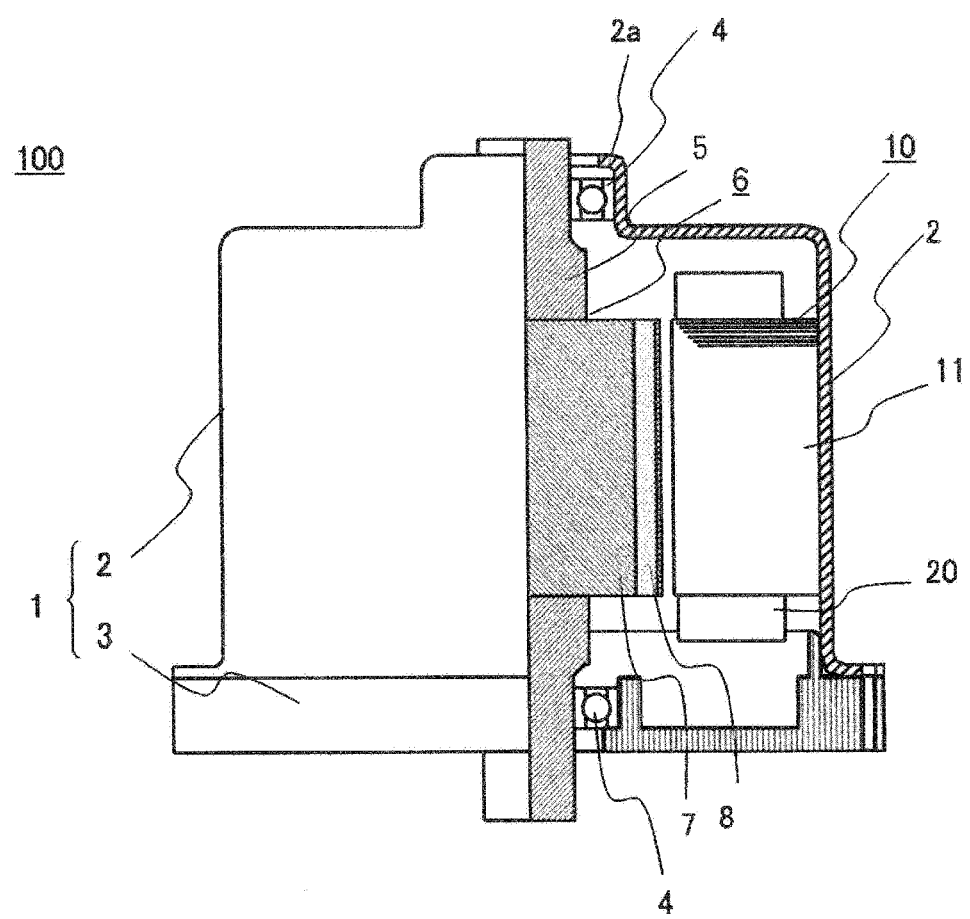
FIG. 1 is a one-side cross-sectional view illustrating a rotary electric machine according to Embodiment 1 of the present invention.
Figure 2:
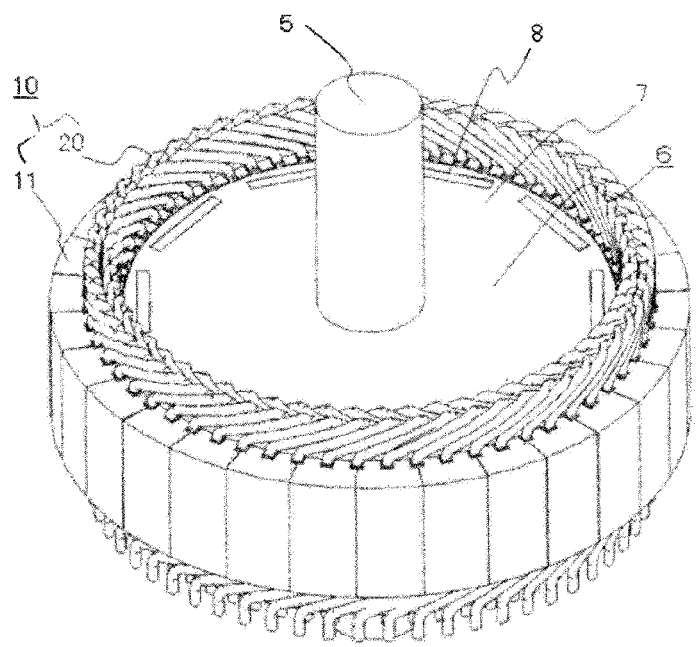
FIG. 2 is an oblique perspective view illustrating a main portion of the rotary electric machine according to Embodiment 1 of the present invention.
Figure 3:
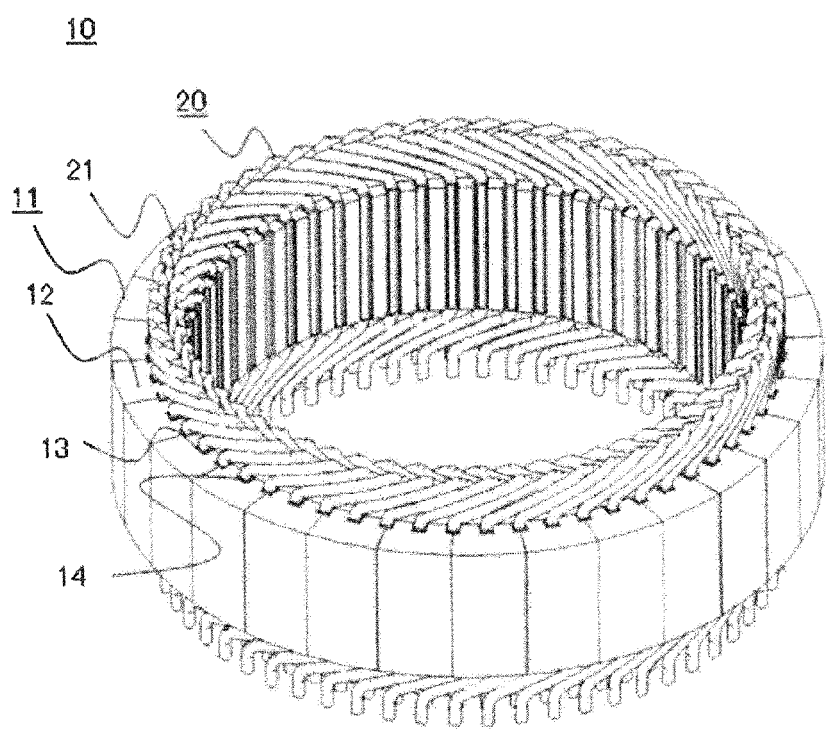
FIG. 3 is an oblique perspective view illustrating a stator of the rotary electric machine according to Embodiment 1 of the present invention.
Figure 4:
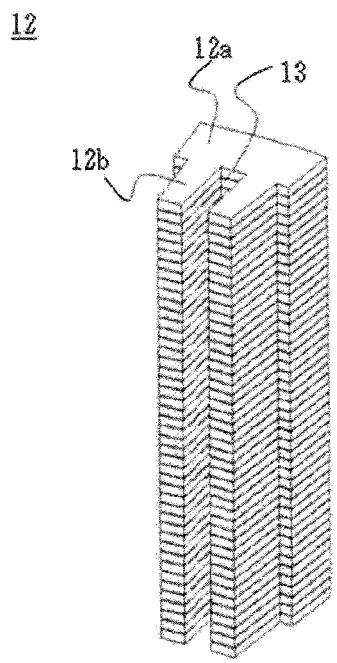
FIG. 4 is an oblique perspective view illustrating a core block of the rotary electric machine according to Embodiment 1 of the present invention.
Figure 5:
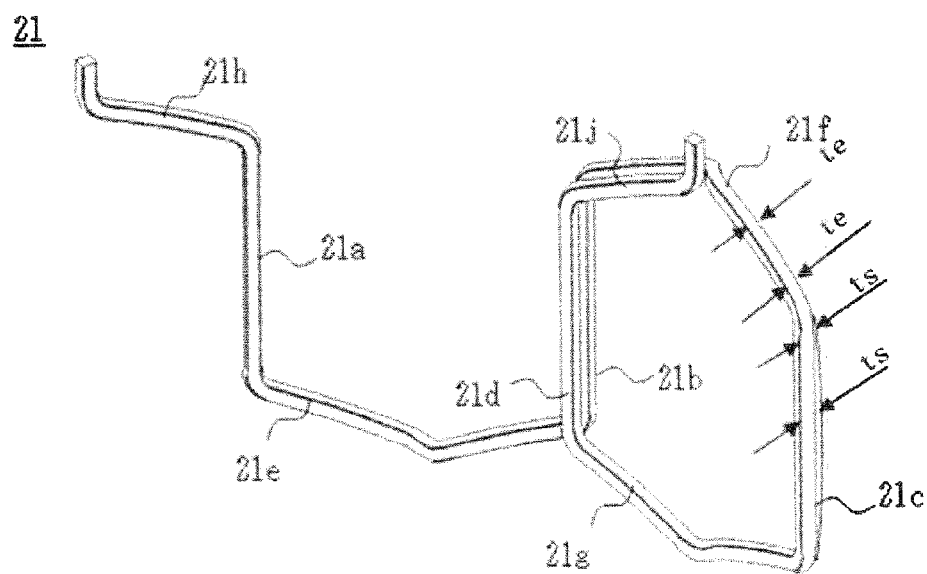
FIG. 5 is an oblique perspective view illustrating a coil conductor composing a stator winding of the rotary electric machine according to Embodiment 1 of the present invention.
Figure 6:
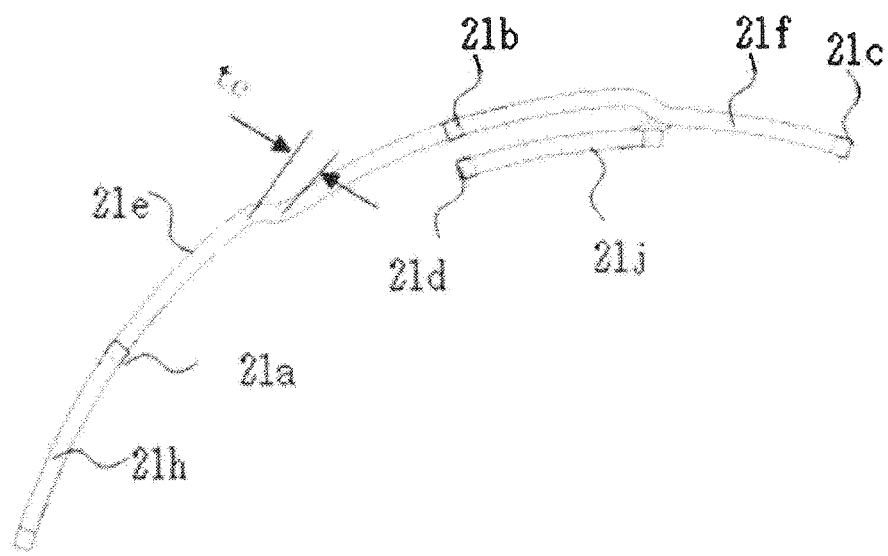
FIG. 6 is a plane view illustrating the coil conductor composing the stator winding of the rotary electric machine according to Embodiment 1 of the present invention.
Figure 7:
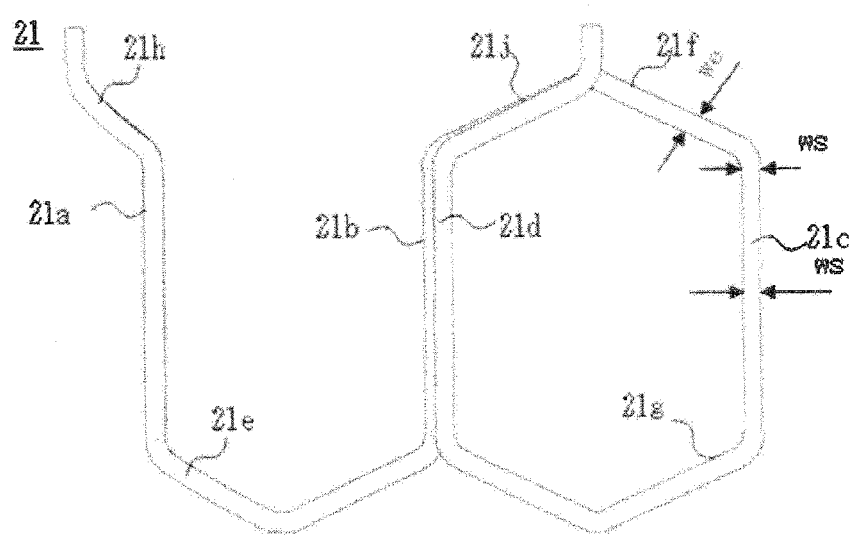
FIG. 7 is a front view illustrating the coil conductor of the rotary electric machine according to Embodiment 1 of the present invention.
Figure 8:
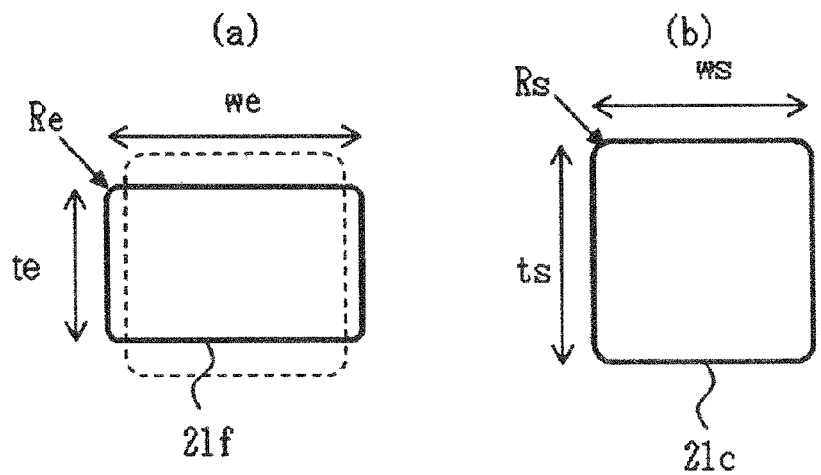
FIG. 8 are cross-sectional views illustrating a coil end and a coil slot of the coil conductor composing the stator winding of the rotary electric machine according to Embodiment 1 of the present invention.
Figure 9:
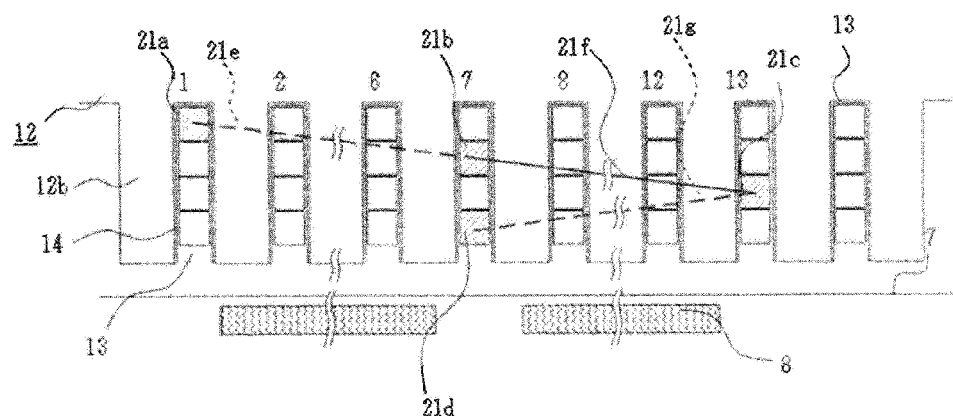
FIG. 9 is a schematic and cross-sectional view illustrating an arrangement of the coil conductor composing the stator winding of the rotary electric machine according to Embodiment 1 of the present invention.
Figure 10:
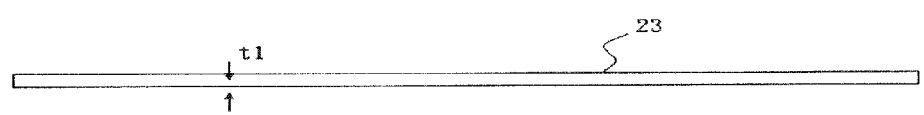
FIG. 10 is a first schematic view illustrating a manufacturing method for the coil conductor composing the stator winding of the rotary electric machine according to Embodiment 1 of the present invention.
Figure 11:
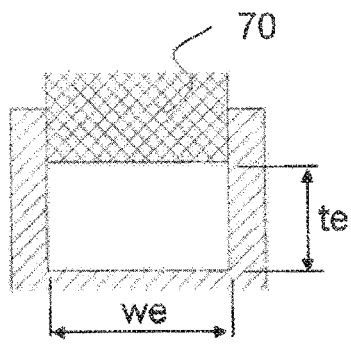
FIG. 11 is a second schematic view illustrating a manufacturing method for the coil conductor composing the stator winding of the rotary electric machine according to Embodiment 1 of the present invention.
Figure 12:
FIG. 12 is a third schematic view illustrating a manufacturing method for the coil conductor composing the stator winding of the rotary electric machine according to Embodiment 1 of the present invention.
Figure 13:
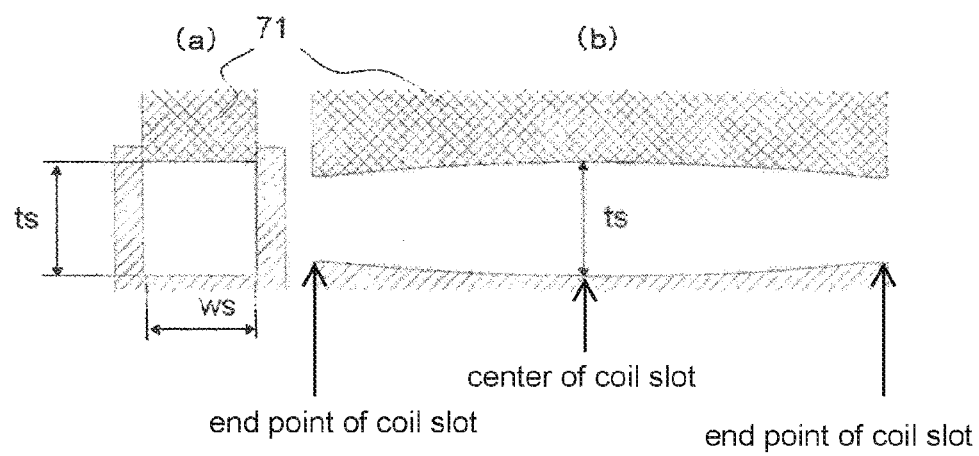
FIG. 13 are forth schematic views illustrating a manufacturing method for the coil conductor composing the stator winding of the rotary electric machine according to Embodiment 1 of the present invention.
Figure 14:
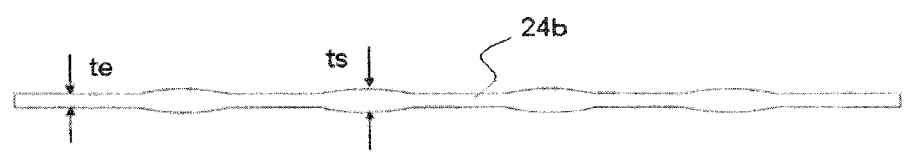
FIG. 14 is a fifth schematic view illustrating a manufacturing method for the coil conductor composing the stator winding of the rotary electric machine according to Embodiment 1 of the present invention.

FIG. 1 is a one-side cross-sectional view illustrating a rotary electric machine according to Embodiment 1 of the present invention. FIG. 2 is an oblique perspective view illustrating a main portion of the rotary electric machine. FIG. 3 is an oblique perspective view illustrating a stator of the rotary electric machine. FIG. 4 is an oblique perspective view illustrating a core block of the rotary electric machine. FIG. 5 is an oblique perspective view illustrating a coil conductor composing a stator winding of the rotary electric machine. FIG. 6 is a plane view illustrating the coil conductor composing the stator winding of the rotary electric machine. FIG. 7 is a front view illustrating the coil conductor of the rotary electric machine. FIG. 8 are cross-sectional views illustrating a coil end and a coil slot of the coil conductor composing the stator winding of the rotary electric machine. FIG. 9 is a schematic and cross-sectional view illustrating an arrangement of the coil conductor composing the stator winding of the rotary electric machine. FIG. 10 through FIG. 14 are schematic views illustrating a manufacturing method for the coil conductor composing the stator winding of the rotary electric machine. FIG. 10 is a side view illustrating a previous state of a manufacturing process for a conductor composing the coil conductor, and FIG. 11 is a schematic front cross-sectional view illustrating a mold for processing the conductor, and FIG. 12 is a side view illustrating a halfway state of a manufacturing process for the conductor. FIG. 13A is a front cross-sectional view and FIG. 13B is a side cross-sectional view, and FIG. 13A and FIG. 13B schematically illustrate a mold for additionally processing the conductor, and FIG. 14 is a side view illustrating a terminated state of the manufacturing process for the conductor.

As illustrated in FIG. 1, a rotary electric machine 100 includes a motor case 1 which has a frame 2, having a cylindrical shape with a bottom, and a bracket 3 for closing an aperture of the frame 2; a stator 10 which is fixed to a cylinder of the frame 2 in a state where the stator 10 is fitted into the cylinder; and a rotor 6 which is fixed to a rotary shaft 5 being rotatably supported, via a bearing 4, to a bottom 2a of the frame 2 and to the bracket 3, and is rotatably arranged in the inner circumference side of the stator 10.

The rotor 6 is a permanent magnet rotor that includes a rotor core 7, which is fixed to the rotary shaft 5 being inserted at a shaft-center position, and permanent magnets 8, composing a magnetic pole, which are installed at an outer surface side of the rotor core 7 and arranged in a circumference direction at regular pitches. In addition, the rotor 6 is not limited to the permanent magnet rotor, so that a squirrel-cage-type rotor, in which non-insulated rotor conductors are installed in slots of the rotor core 7, and both sides of the conductors are shorted by a short ring, or a winding-type rotor, in which insulated conductors are installed in the slots of the rotor core 7, may be used.

Hereinafter, a configuration of the stator 10 will be specifically explained. As illustrated in FIG. 2 and FIG. 3, the stator 10 includes a stator core 11 and a stator winding 20 that is mounted on the stator core 11. Hereinafter, in order to easily explain the configuration, it is defined that a number of poles of the rotor 6 is 8, a number of slots of the stator core 11 is 48, and the stator winding 20 is a three-phase winding. In other words, the slots are formed at a ratio of two per each pole of each phase.

Core blocks 12 are components which are made by dividing the stator core 11 having an annular shape into 48 equal parts in a circumferential direction, and those are formed by laminating and integrating magnetic steel sheets. As illustrated in FIG. 4, the core blocks 12 include core-back portions 12a of which cross-sectional surface has a circular shape, and teeth 12b which are extended from inner circumferential surface of the core-back portions 12a to a diameter direction. Moreover, the stator core 11 is configured in an annular shape in such a way that the teeth 12b are faced to the inside in a diameter direction, and side faces in a circumferential direction of the core-back portions 12a are faced each other, and 48 core blocks 12 are arranged in a circumferential direction and integrated. Slots 13 composed of the core blocks 12, which are neighbored in a circumferential direction, are arranged with an isometric pitch in a circumferential direction so as to be opened toward the inner circumferential side. The teeth 12b are formed with a narrowed shape in which a width in the circumferential direction gradually narrows toward the inside in the circumferential direction, and the slots 13 have a rectangular shape. In the inner circumferential surface of the slots 13, slot cells used as an insulation material are mounted as illustrated in FIG. 3 and FIG. 4.

The stator winding 20 is configured in such a way that a wire-connection process is performed to a winding assembly mounted on the stator core 11. Coil conductors 21 composing the stator winding 20 are formed in such a way that a conductor having a rectangular cross section, which is made of a consecutive copper wire or aluminum wire which is isolated by, for example, an enamel resin and doesn't have a connecting portion, is wound in edgewise. The stator winding 20 is unified and configured in such a way that a plurality of the coil conductors 21, which are formed as described above, are combined, and the stator core 11 is inserted from an outer circumference direction to the winding assembly which is formed in an annular shape.

The coil conductors 21 include four coil slots—a first coil slot 21a, a second coil slot 21b, a third coil slot 21c, and a fourth coil slot 21d—, which are separated at a six-slot-angle distance and arranged in three rows; and three coil ends—a first coil end 21e for connecting the first coil slot 21a to the second coil slot 21b, a second coil end 21f for connecting the second coil slot 21b to the third coil slot 21c, and a third coil end 21g for connecting the third coil slot 21c to the fourth coil slot 21d—; and a leading coil end 21h and a terminating coil end 21j, which are connected to the other coil, a feeding point, and a neutral point. In addition, the six-slot-angle distance means a distance between slot centers of the slots 13 at both sides of the six continuous teeth 12b, and the six-slot-angle distance corresponds to one pole pitch.

The first coil slot 21a, the second coil slot 21b, the third coil slot 21c, and the fourth coil slot 21d of the coil conductors 21, which are inserted to the slots 13 of the stator core 11, are compressed and crushed in an inner circumferential direction of the rotary electric machine, and an amount of compression at a central portion is larger than an amount of compression at both end portions, whereby cross-sectional areas of the coil conductors 21 of the coil slots at the central portion are wider than cross-sectional areas of those at the both end portions.

In the slots 13 of the stator core 11, when a thickness in a diameter direction of the coil conductor 21 of each of the coil slots is "ts", and a length in a circumferential direction is "ws", and a thickness in a diameter direction of the coil conductor 21 of each of the coil ends is "te", the thickness "te" is thinner than the thickness "ts" (ts>te). Moreover, a cross-sectional area "ts×ws" of the coil conductor 21 is wider than a cross-sectional area "te ×we", and cross-sectional area "ts×ws" is gradually varied along slots 13 from the central portion to the coil end portion.

As described above, the cross-sectional area at the central portions of the coil conductors of the coil slots is wider than the cross-sectional area at the both end portions of the coil slots, so that a current density can be decreased, and heat generation of the central portions, at which a temperature of the stator winding 20 is high, can be suppressed.

In Embodiment 1, before the coil having a nearly square cross section is inserted to the slot of the stator core, the coil is compressed and crushed in an inner circumferential direction of the stator core, whereby the cross section of the coil is deformed to a rectangle shape, and an amount of compression is gradually increased from the central portion to the coil end, and the cross-sectional area of the coil is gradually decreased from the central portions of the coil slots to the coil end.

The gap between the coils in a diameter direction at the coil ends of the coil conductors 21 is gradually enlarged along positions from the central portions of the coil slots to the coil end, so that a resin, such as a varnish, can be effectively infiltrated by dropping the resin, such as a varnish, from the gap between the coils to the central portion in an axis direction of the slots.

Hereinafter, a manufacturing method for the coil conductors 21 will be explained.

Firstly, a conductor 23 having a length for forming one coil, in which a thickness "t1" in a diameter direction is slightly shorter than "ts", and a length "w1" in a circumferential direction is slightly longer than "ws", is prepared as illustrated in FIG. 10.

The conductor 23 is formed by compressing and crushing the coil conductors at five positions, which are varied to the coil end later, by using a mold 70 as illustrated in FIG. 11, from a width (thickness in a diameter direction) "t1" direction. As a result, a conductor 24a is formed as illustrated in FIG. 12.

Moreover, the conductor 24a is formed by compressing and crushing the coil conductors at four positions, which are inserted to slots later, by using a mold 71, as illustrated in FIG. 13, from the width (thickness in the diameter direction) "t1" direction. The mold 71 has a central portion having a concave bow shape, and it is defined that an amount of compression at the end portion is greater than an amount of compression at the central portion. A conductor 24b illustrated in FIG. 14 is formed by the compressing and crushing process in the above-described two steps.

A coil end portion of the conductor 24b is bent in a shape of eight, and a shape of a crank at an apex of the coil end and a curvature of the coil end, which are not illustrated, are formed, whereby the coil conductors 21 are formed. Forty-eight coil conductors 21 are arranged in a circumferential direction, whereby the stator winding 20 illustrated in FIG. 3 is formed.

A method, by which the stator winding 20 is formed by compressing and crushing the coil conductors by a mold, is indicated in the above-described description, it is possible that the stator winding 20 is formed by pressing and crushing the coil conductors by a roller.

As described above, the stator winding 20 includes the coil slots, which are inserted to the slots, and the coil ends, which are extended to the outside in the axis direction of the stator core. In the coil conductor of the coil slots, the cross-sectional area at the central portion in the axis direction is wider than the cross-sectional area at the both end portions, and the cross-sectional area is gradually decreased from the central portion to the both end portions, whereby a share of the coil slots of the stator winding 20 in the slots formed in the stator core is increased, and a heating value at the central portion of the stator can be decreased.

Moreover, in the coil conductor of the coil slots, the cross-sectional area at the central portion in the axis direction is wider than the cross-sectional area at the both end portions, and the cross-sectional area is gradually decreased from the central portion to the both end portions, so that gaps are formed between the each of the coil conductors 21, and a resin, such as a varnish, can be effectively infiltrated by a capillary phenomenon, and an isolation and heat-transfer capacity between the coils can be improved.

Embodiment 2

Figure 15:
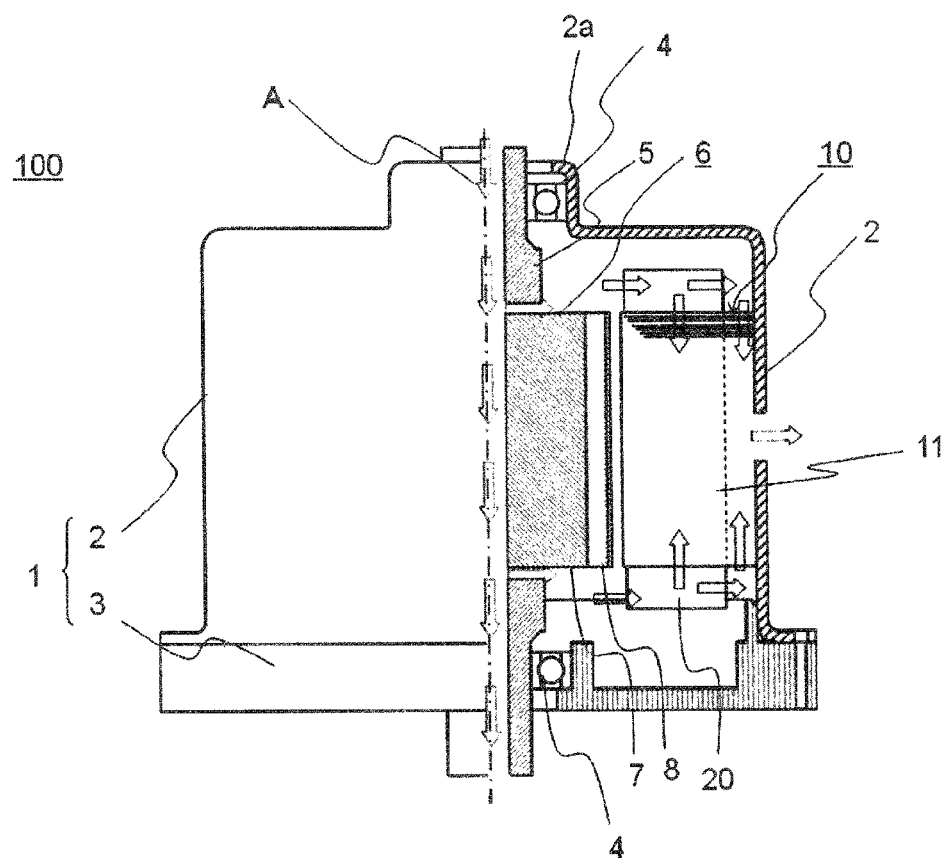
FIG. 15 is a one-side cross-sectional view illustrating a rotary electric machine according to Embodiment 2 of the present invention.

Hereinafter, a rotary electric machine according to Embodiment 2 of the present invention will be explained in reference to FIG. 15. FIG. 15 is a one-side cross-sectional view illustrating a rotary electric machine according to Embodiment 2 of the present invention.

It is the similar way described in Embodiment 1 that cross-sectional area of coil conductors 21 of a stator winding 20 at portions, which are inserted to slots 13 of a stator core 11, is varied in an axis direction, whereby the cross-sectional area at a central portion is wider than the cross-sectional areas at both end portions, and the cross-sectional area of the coil conductors 21 is gradually reduced along the coil conductors 21 from the central portion to the both end portions. However, in Embodiment 2, a rotary electric machine 200 has an oil-cooling structure, in which oil is infiltrated to the stator core 11 and the stator winding 20. In this Embodiment 2, the rotary electric machine 200 has a configuration in which the oil is forcibly poured into gaps between coils as indicated by arrow "A" in FIG. 15, and the oil is infiltrated to the gaps between the coils, whereby a cooling capacity at the central portion of the stator core 11 and a cooling capacity at the central portion of the coil of the stator winding 20 can be improved.

The present invention is not limited to the above-described embodiments, and it is possible in the scope of the present invention that each of the embodiments is freely combined, or each of embodiments is suitably modified or omitted.

What is claimed is:

1. A rotary electric machine comprising:
a stator core having an annular shape, in which a plurality of slots formed in an axis direction of the stator core are arranged in a circumferential direction; and
a stator winding which is composed of a plurality of coil conductors wound around the slots of the stator core; wherein
the stator winding is composed of coil slots, which are inserted to the slots, and coil ends extended toward the outside in the axis direction of the stator core; and
the coil conductors of the coil slots are compressed in a diameter direction of the coil conductors so that cross-sectional areas of the coil conductors in the diameter direction are gradually and continuously reduced along the coil slots from a point at the center of the coil slots to the coil ends and a gap between the coil conductors in the diameter direction at the coil ends is gradually increased from the center of the coil slots to the coil ends.

2. A rotary electric machine as recited in claim 1, wherein when varnish is dropped into the gap between the coil conductors, the gap between the coil conductors infiltrates the varnish into the center of the coil slots.

3. A rotary electric machine as recited in claim 1, wherein an oil-cooling structure is included, and oil is infiltrated by using the gap between the coil conductors as oil passages.

* * * * *